April 29, 1930.  F. L. ALLENSWORTH  1,756,327
BEAD SETTING RING
Filed Sept. 12, 1928
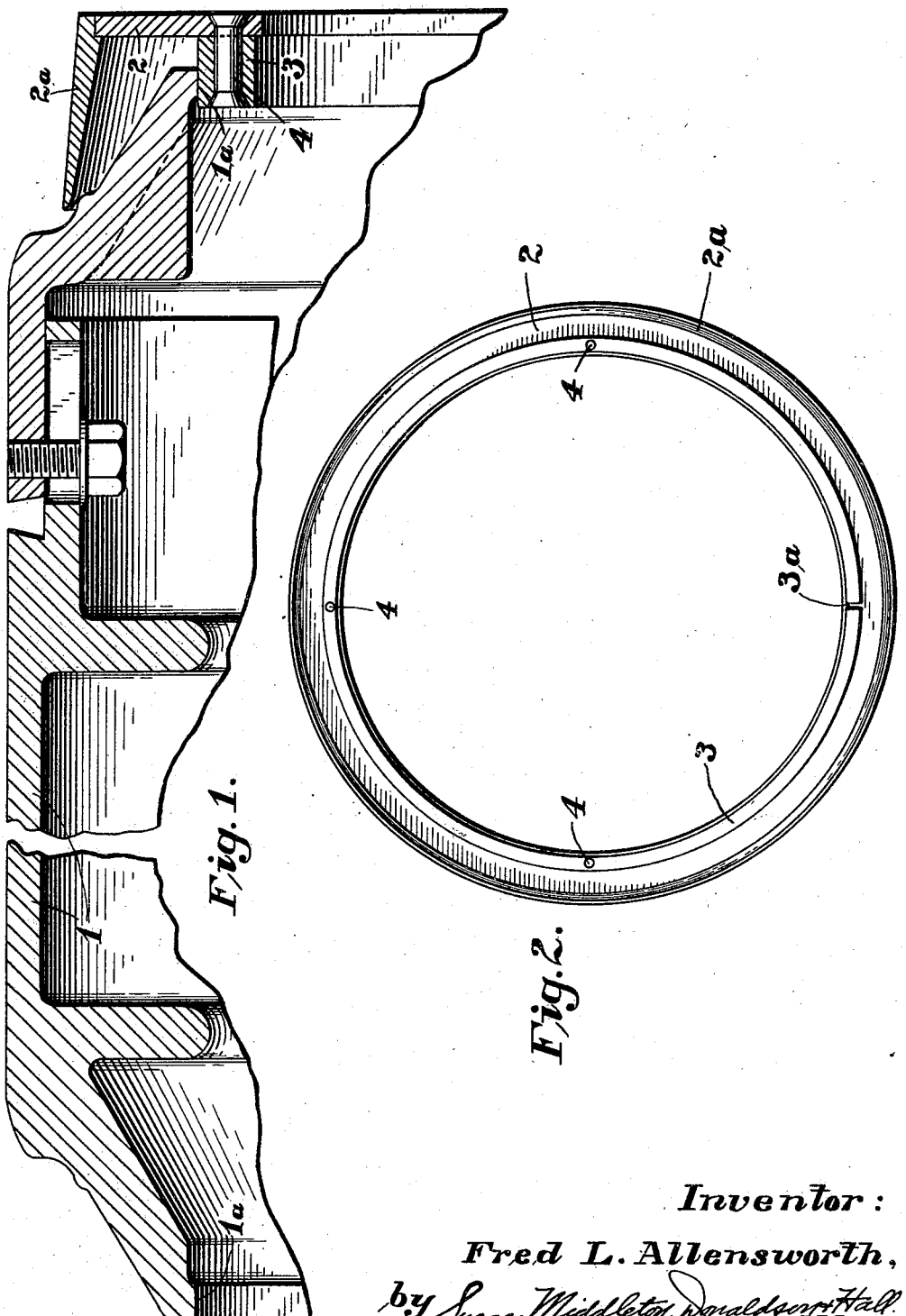
Inventor:
Fred L. Allensworth,
by Spear, Middleton, Donaldson & Hall
Attys.

Patented Apr. 29, 1930

1,756,327

UNITED STATES PATENT OFFICE

FRED L. ALLENSWORTH, OF AKRON, OHIO, ASSIGNOR TO THE MILLER RUBBER COMPANY, OF AKRON, OHIO, A CORPORATION OF OHIO

BEAD-SETTING RING

Application filed September 12, 1928. Serial No. 305,554.

My invention relates to improvements in bead setting rings for use with apparatus for the manufacture of tires.

An object of the invention is the provision of a bead setting ring which is readily applicable to and removable from a tire building drum such as used in the drum building process.

A further object is the provision of means for securely retaining the bead setting ring in operating position on the tire building drum.

These and other objects I attain by the construction shown in the accompanying drawings wherein for the purpose of illustration is shown a preferred embodiment of my invention and wherein:

Figure 1 is a fragmentary cross section through the building drum and the bead setting ring applied thereto.

Fig. 2 is an elevation of the bead setting ring looking from the inside thereof.

According to my invention, a split retaining ring forming a part of the bead setting ring serves to hold the latter in place on the tire building drum or equivalent apparatus.

In the drawing, 1 represents a tire building drum as used in the drum building process of manufacturing tires. The drum 1 is provided with annular inwardly facing shoulders $1^a$. As shown in Fig. 1, the bead setting ring 2 of my invention is applied to the shoulder $1^a$ of the drum 1.

The bead setting ring 2 has a laterally turned flange portion $2^a$ extending from the ring portion 2.

Secured to the ring portion 2 of the bead setting ring by means of three rivets or other suitable fastening means 4, is a spring ring 3, which is split as shown at $3^a$ and is unattached to the ring 2 throughout approximately 180° of its circumference.

The split spring ring 3 is preferably split at a point midway of its unattached portion. In this instance, where the unattached portion extends through approximately 180°, the split $3^a$ is located approximately 90° from either attaching means 4.

It will be apparent that any number of attaching means or rivets 4 may be provided while providing the desired unattached portion.

The outside diameter of the split retaining ring 3 is preferably the same as the inside diameter of the shoulder $1^a$ of the building drum, and the splitting of the ring 3 at the point $3^a$ causes the ring to spring out to a larger diameter for the purpose of making the ring 3 a spring fit in the shoulder $1^a$ of the drum to hold the bead setting ring securely in place while rendering it readily removable.

In applying the bead setting ring to the drum, the split retaining ring 3 is contracted and inserted within the shoulder $1^a$ and allowed to expand to hold the bead setting ring in place. In removing the ring, it may be simply forced outwardly.

I claim:

1. A bead setting ring having a split retaining ring secured thereto, said retaining ring being split at one point only of its circumference and unattached with respect to said head setting ring throughout approximately one half of its circumference including the split.

2. In combination in tire building apparatus a tire building drum having an annular inwardly facing shoulder at its edge, a bead setting ring having a retaining ring secured thereto, said retaining ring being split at one point only of its periphery and unattached with respect to said bead setting ring throughout a portion of its circumference including the split, said split retaining ring being adapted to engage said shoulder to hold the bead setting ring in place on the drum.

3. Apparatus according to claim 2 in which said unattached portion of the retaining ring including the split extends through approximately 180° or one half of the circumference of the retaining ring, the split being midway of the unattached portion.

In testimony whereof, I affix my signature.

FRED L. ALLENSWORTH.